US010237866B2

(12) United States Patent
Hwang et al.

(10) Patent No.: US 10,237,866 B2
(45) Date of Patent: Mar. 19, 2019

(54) ADAPTIVE TRANSMISSION METHOD AND APPARATUS FOR IMPROVING VEHICULAR COMMUNICATION PERFORMANCE

(71) Applicant: INDUSTRY FOUNDATION OF CHONNAM NATIONAL UNIVERSITY, Gwangju (KR)

(72) Inventors: Intae Hwang, Yongin-si (KR); Sangmi Moon, Gwangju (KR); Myeonghun Chu, Gwangju (KR); Jihye Lee, Gwangju (KR); Soonho Kwon, Suncheon-si (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 0 days.

(21) Appl. No.: 15/686,594

(22) Filed: Aug. 25, 2017

(65) Prior Publication Data

US 2018/0077695 A1    Mar. 15, 2018

(30) Foreign Application Priority Data

Sep. 13, 2016    (KR) .................. 10-2016-0117987

(51) Int. Cl.
*H04W 72/04*    (2009.01)
*H04L 5/00*    (2006.01)
*H04W 4/46*    (2018.01)
*H04W 84/00*    (2009.01)
*H04W 88/02*    (2009.01)
*H04W 88/08*    (2009.01)

(52) U.S. Cl.
CPC ......... *H04W 72/044* (2013.01); *H04L 5/0005* (2013.01); *H04W 4/46* (2018.02); *H04W 72/042* (2013.01); *H04W 72/048* (2013.01); *H04W 84/005* (2013.01); *H04W 88/02* (2013.01); *H04W 88/08* (2013.01)

(58) Field of Classification Search
CPC ... H04W 72/042; H04W 4/46; H04W 72/044; H04W 72/048; H04W 88/08; H04W 88/02; H04W 84/005; H04L 5/0005
See application file for complete search history.

(56) References Cited

U.S. PATENT DOCUMENTS

2017/0242132 A1*    8/2017    Kim .................. G01S 17/023
2017/0265198 A1*    9/2017    Sorrentino ............ H04W 72/12
(Continued)

OTHER PUBLICATIONS

"Position based Resource Allocation Scheme for V2V Communication," the Institute of Electronics and Information Engineers of Korea, Sep. 5, 2016, pp. 1-7.
(Continued)

*Primary Examiner* — Brian D Nguyen
(74) *Attorney, Agent, or Firm* — Hauptman Ham, LLP

(57) ABSTRACT

Disclosed is an adaptive transmission method for a vehicular communication system, that is, a method of randomly allocating resources in a time domain and a frequency domain to perform vehicular communication in a Long-Term Evolution (LTE)-based vehicle to everything (V2X) system and determining whether to transmit messages according to a transmission probability such that it is possible to improve cumulative distribution functions (CDFs) of packet reception ratios (PRRs) and average PRRs by decreasing interference between vehicles.

6 Claims, 17 Drawing Sheets

(56) References Cited

U.S. PATENT DOCUMENTS

| | | | |
|---|---|---|---|
| 2017/0268896 A1* | 9/2017 | Bai | G01C 21/36 |
| 2017/0369055 A1* | 12/2017 | Saigusa | B60W 30/09 |
| 2018/0005254 A1* | 1/2018 | Bai | G06Q 30/0203 |
| 2018/0015922 A1* | 1/2018 | McNew | B60W 30/165 |
| 2018/0061232 A1* | 3/2018 | Madigan | G08G 1/096783 |

OTHER PUBLICATIONS

Korean Office Action dated Jul. 17, 2017, issued in corresponding Korean Patent Application No. 10-2016-0117987, citing the above reference.

Korean Decision to Grant Patent dated Jan. 25, 2018, issued in corresponding Korean Patent Application No. 10-2016-0117987, citing the above reference.

"Position based Resource Allocation Scheme for V2V Communication", 2016 Institute of Electronics and Information Engineers, Google uploading date: Sep. 5, 2016, www.ieek.or.kr/paperv4/File/O_PDF/2016-09-05_2016-09-04TC_1.pdf.

Sangmi Moon et al., "A Study on the adaptive transmission scheme in V2V systems", Chonnam National University, The Korean Institute of Communications and Information Sciences summer conference, pp. 74 and 75.

Korean Office Action dated Jul. 17, 2017 corresponding to Korean Application No. KR 10-2016-0117987, citing the above reference(s).

* cited by examiner

ADAPTIVE TRANSMISSION METHOD AND APPARATUS FOR IMPROVING VEHICULAR COMMUNICATION PERFORMANCE

CROSS-REFERENCE TO RELATED APPLICATION

This application claims priority to and the benefit of Korean Patent Application No. 10-2016-0117987, filed on Sep. 13, 2016, the disclosure of which is incorporated herein by reference in its entirety.

TECHNICAL FIELD

The present invention relates to an adaptive transmission method and apparatus for improving vehicular communication performance, and more particularly, to an adaptive transmission method and apparatus for improving vehicular communication performance in a mobile-communication-network-based vehicle-to-everything (V2X) system by randomly allocating resources in a time domain and frequency domain and determining whether to transmit a message according to a transmission probability.

BACKGROUND

This section is intended to merely provide a background for embodiments of the present invention and does not constitute prior art.

Communication technology has been used for the purpose of communicating and delivering information between people. Recently, however, communication technology is expanding to communication between people and objects and communication between objects. Rather than communication between people, communication between people and objects and communication between objects have been proposed as various application cases and scenarios, some of which are commercialized and standardized to be in a realization phase. In particular, recently, there is a rapid trend of forming vehicle to everything (V2X) networks such as vehicle to vehicle (V2V) networks, vehicle to pedestrian (V2P) networks, and vehicle to infrastructure (V2I) networks.

In recent years, technologies for improving road safety and facilitating smooth vehicle operation have been developed in the field of V2X communication. Presently, a technology for providing traffic volume information and searching for a detour through digital media broadcasting (DMB) data communication is widely used for a conventional navigation system.

However, what V2X considers is much more evolved than that described above. When each vehicle having a sensor installed therein checks a vehicular interval, a vehicular speed, or the like through communication with other vehicles and transmits the checked information, information regarding accidents, traffic volume, or the like is provided to subsequent vehicles that access nearby regions. Thus, it is possible to prevent a traffic accident and also guide a smooth traffic flow.

This technology has had its effectiveness validated through several projects over several years by countries participating in the development of telematics technology and intelligent transportation systems (ITS) technology, such as Europe, North America, Japan, and South Korea.

Recently, thanks to the wide use of smartphones and the expansion of LTE services, even V2X technology for connecting a vehicle and a smartphone to provide various additional services by using the smartphone and the Internet in the vehicle is being developed.

SUMMARY

The $3^{rd}$ Generation Partnership Project (3GPP) is an international communication standard organization. Presently, mobile communication networks based on the 3GPP including Long-Term Evolution (LTE) occupy the majority of the world's communication networks, and thus each country's service providers are likely to adopt the 3GPP international standard for research or development in consideration of compatibility and interoperation with pre-existing networks.

Accordingly, it is important to develop a performance analysis algorithm for a cellular-multi-antenna-based vehicle to everything (V2X) system.

The present invention is directed to providing an adaptive transmission method and apparatus for improving vehicular communication performance, the adaptive transmission method and apparatus being capable of randomly allocating resources in a time domain and a frequency domain and determining whether to transmit messages according to a transmission probability.

According to an aspect of the present invention, there is an adaptive transmission method for improving vehicular communication performance in a V2X system based on a mobile communication network, which is performed by a vehicle terminal, the adaptive transmission method including: receiving allocated resources; setting a message transmission probability; and transmitting a message to a partner terminal by using the allocated resources according to the set transmission probability.

The setting may include setting the message transmission probability in consideration of a speed of the vehicle terminal.

The vehicular communication performance may be determined in consideration of packet reception ratios (PRRs).

The receiving may include receiving resources randomly allocated in units of a subchannel in a frequency domain and receiving resources randomly allocated in units of a subframe in a time domain.

The partner terminal may be any one of another vehicle terminal, a pedestrian terminal, and a road side unit (RSU).

The message may be generated according to a traffic model, and the traffic model may be a periodic traffic model or an event-trigger traffic model.

The transmitting may include transmitting the message in consideration of a speed of the vehicle terminal and the number of transmissions.

The vehicular communication performance may be affected by a combination of the resources used to transmit the message, the transmission probability, the speed of the vehicle terminal, and the number of transmissions.

According to another aspect of the present invention, there is an adaptive transmission apparatus including a communication unit configured to transmit or receive data to or from a base station or a partner terminal; a message generation unit configured to generate a message according to a traffic model; and a control unit configured to request that the base station allocate resources through the communication unit, and configured to control transmission of the generated message by using the allocated resources according to a preset transmission probability.

The transmission probability may be set in consideration of a speed of a vehicle terminal.

The control unit may further consider a speed of a vehicle terminal and the number of transmissions when the message is transmitted.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Figure 1:
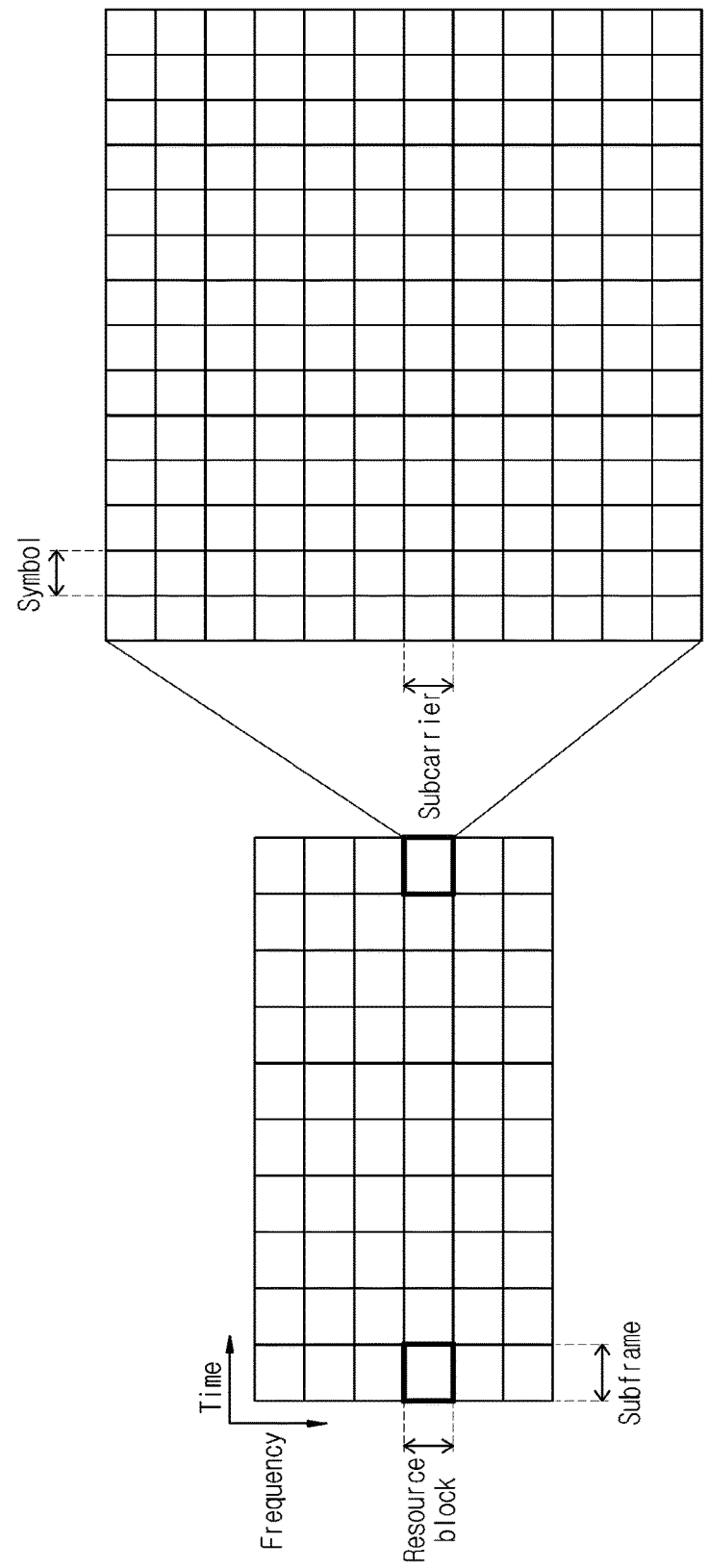
FIG. 1 is a diagram showing a resource unit in a Long-Term Evolution (LTE) system.

Hereinafter, exemplary embodiments of the present invention will be described in detail with reference to the accompanying drawings. Features and advantages of aspects of the present invention will become more apparent from the detailed description set forth below.

However, detailed descriptions of well-known functions or configurations that unnecessarily obscure the gist of the invention in the following explanations and accompanying drawings will be omitted. In addition, it should be noted that like reference numerals denote like elements throughout the specification and drawings.

Terms and words used in this specification and claims are not to be interpreted as limited to commonly used meanings or meanings in dictionaries, and should be interpreted with meanings and concepts which are consistent with the technological scope of the invention based on the principle that the inventors have appropriately defined concepts of terms in order to describe the invention in the best way.

Therefore, since the embodiments described in this specification and configurations illustrated in drawings are only exemplary embodiments and do not represent the overall technological scope of the invention, the invention should be understood to cover various equivalents, modifications, and substitutions at the time of filing of this application.

While the terms including an ordinal number, such as "first," "second," etc., may be used herein to describe various elements, such elements are not limited to those terms. The terms are only to distinguish one element from another. For example, a first element could be termed a second element, and similarly, a second element could be termed a first element, without departing from the scope of the present invention.

It should be understood that when one element is referred to as being "connected to" or "coupled to" another element, the elements may be connected or coupled logically or physically. In other words, it should be understood that one element may be directly connected or coupled to another element or indirectly connected or coupled to the other element with a third element intervening therebetween.

The terms used in the present specification are set forth to explain the embodiments of the present invention, and the scope of the present invention is not limited thereto. As used herein, the singular forms "a," "an," and "the" are intended to include the plural forms as well, unless the context clearly indicates otherwise.

It should be further understood that the terms "include," "comprise," or "have," when used in this specification, specify the presence of stated features, steps, operations, components, parts, or combinations thereof, but do not preclude the presence or addition of one or more other features, numerals, steps, operations, components, parts, or combinations thereof.

Moreover, the terms such as "unit," "part," and "module," when used in the specification, denote an element for performing at least one function or operation, and may be implemented in hardware, software, or a combination of hardware and software.

The use of the terms "a," "an," "one," "the," and similar referents in the context of describing embodiments (especially in the context of the following claims) should be construed as covering both the singular and the plural, unless otherwise stated or the context clearly indicates otherwise.

Before describing the present invention, the present invention should be understood as relating to an adaptive transmission method and apparatus for improving vehicular communication performance in a mobile-communication-network-based vehicle to everything (V2X) system. The description will be provided on the basis of the $3^{rd}$ Generation Partnership Project (3GPP) 36.885 standard, which is a representative standard technology associated with vehicular communication, and use Long-Term Evolution (LTE) as an example of a mobile communication network.

Hereinafter, an adaptive transmission method and apparatus for improving vehicular communication performance according to an embodiment of the present invention will be described in detail with reference to the accompanying drawings.

FIG. 1 is a diagram showing a resource unit in an LTE system.

Referring to FIG. 1, a resource block (RB) is defined as a default unit of resource allocation. One RB is composed of 12 subcarriers on a frequency axis and one subframe on a time axis, and the subframe is composed of 14 symbols. That is, one RB is composed of a total of 168 (=12*14) resource elements (REs).

In the rel.12/13 36.885 standard of the 3GPP, wireless communication resources are set by a base station of a network, and time and frequency resources in a resource area are randomly allocated to a terminal to transmit data.

A traffic model for performance evaluation according to adaptive transmission in a V2X system includes periodic traffic and event-trigger traffic.

In the periodic traffic, a message, which is called a cooperative awareness message (CAM), is periodically generated to deliver default information (e.g., a location, a speed, a size, etc.) of a vehicle terminal to other terminals such as nearby vehicle terminals or a road side unit (RSU). In the event-trigger traffic, when a specific event is generated, a message, which is called a decentralized environmental notification message (DENM), is transmitted to other nearby terminals.

For the CAM, a period thereof may vary from 100 ms to 1,000 ms depending on a speed, a location, or the like of a vehicle.

According to an embodiment of the present invention, for the periodic traffic, one 300-byte message is generated, and then four 190-byte messages are generated.

It is assumed that $N_F$ is the total number of RBs, $M_{RB}$ is the number of RBs allocated during data transmission, $M_{SF,x}$ is the number of subframes used during x-byte message transmission, and $T_p$ is a data generation period.

In the periodic traffic model according to an embodiment of the present invention, a random frequency ranges from 0 to $N_F/M_{RB}-1$, and a random time ranges from 0 to $T_p-M_{SF}$.

For example, when $N_F=50$ and $M_{RB}=10$, the random frequency ranges from 0 to 4, and thus frequency resources are randomly allocated in a range of five subchannels. When $T_p=100$ ms, $M_{SF,300}=3$, and $M_{SF,190}=2$, $M_{SF}$ denotes a subframe for a 300-byte message, which is generated first, and thus time resources are randomly allocated in a range of 0 to 97 ms.

Next, a structure of a vehicular communication system will be schematically described.

Figure 2A:
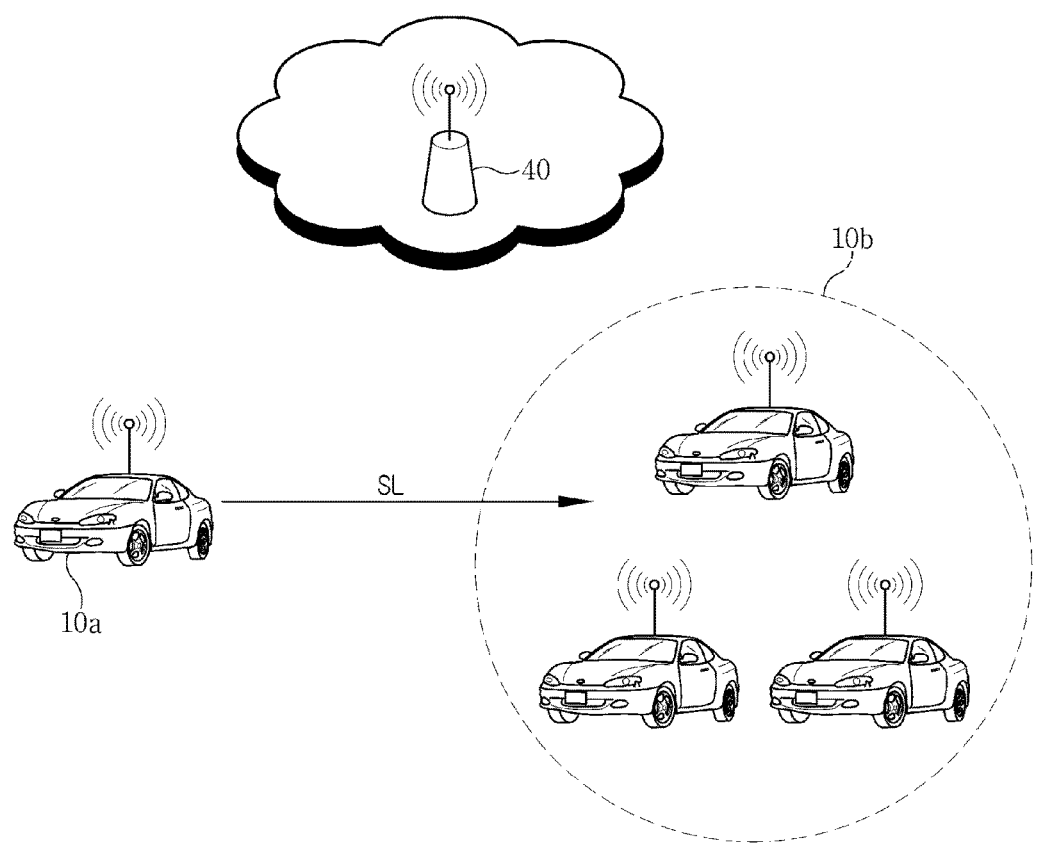
FIG. 2A is a diagram showing transmission of messages between vehicle terminals through a sidelink.
Figure 2B:
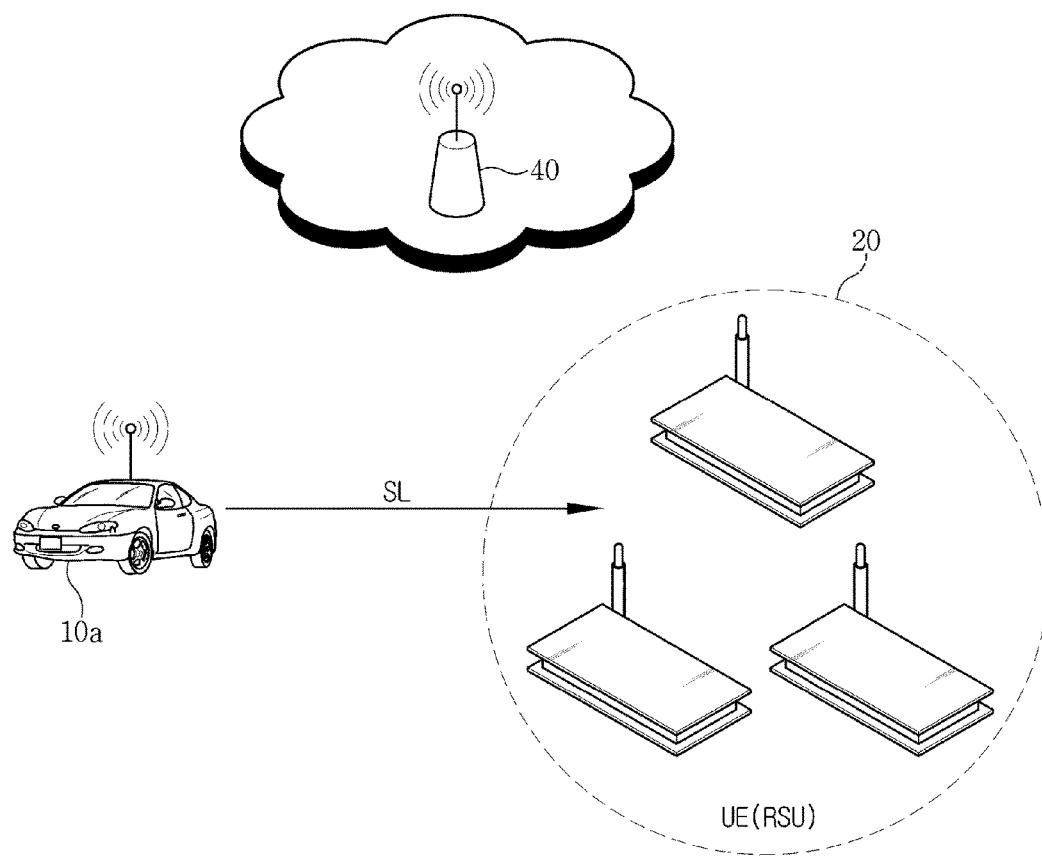
FIG. 2B is a diagram showing transmission of messages between a vehicle terminal and a road side unit (RSU) through a sidelink.
Figure 2C:
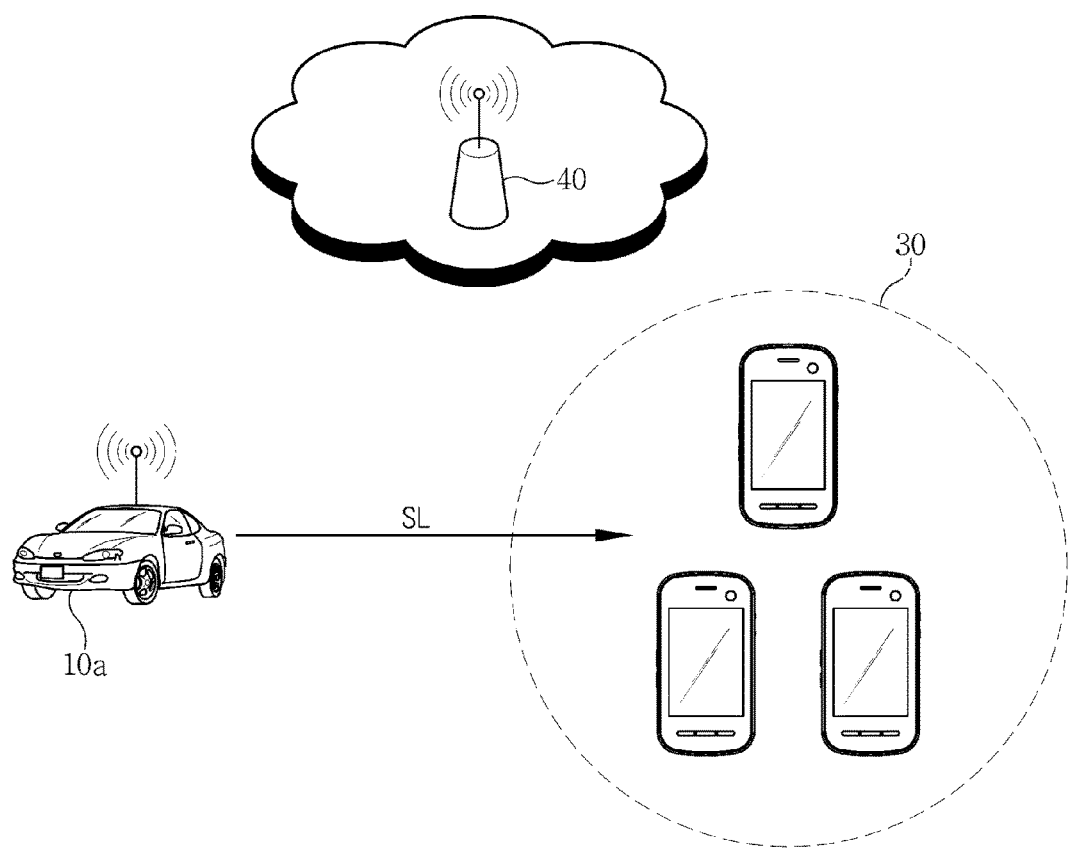
FIG. 2C is a diagram showing transmission of messages between a vehicle terminal and a pedestrian terminal through a sidelink.
Figure 3A:
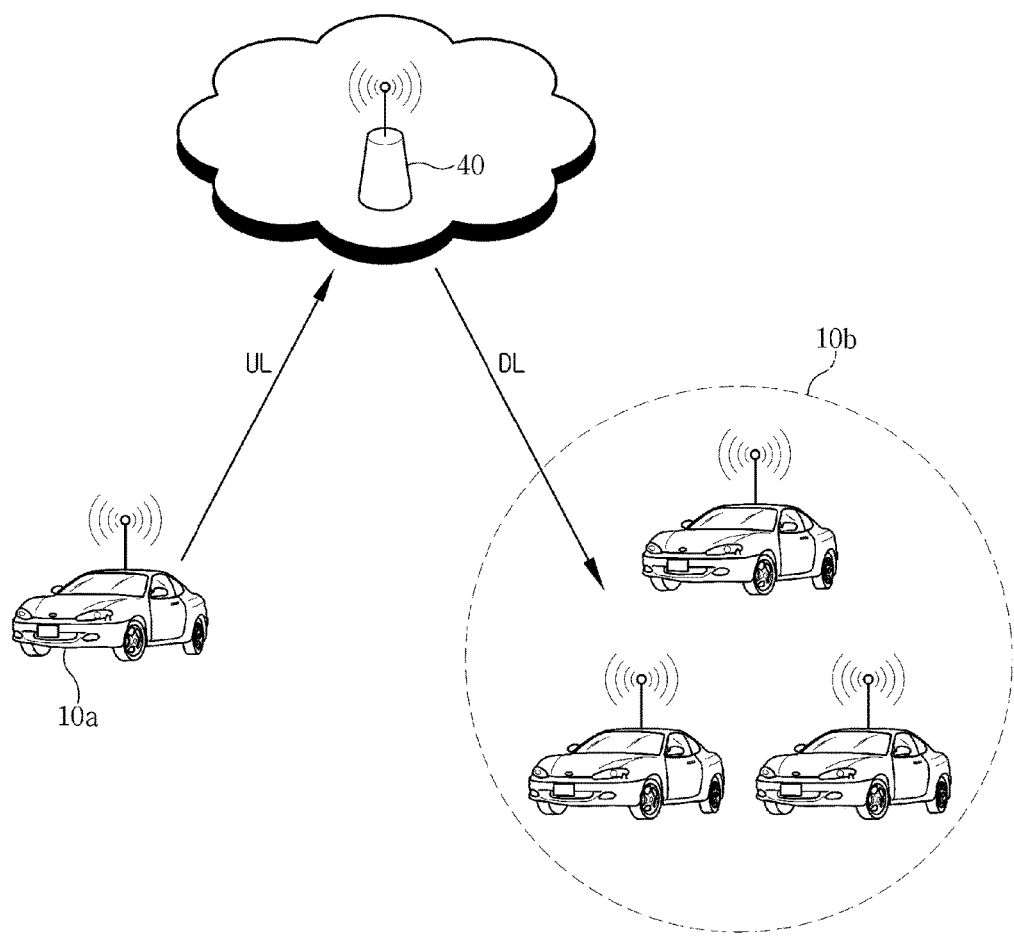
FIG. 3A is a diagram showing transmission of messages between vehicle terminals through a base station.
Figure 3B:
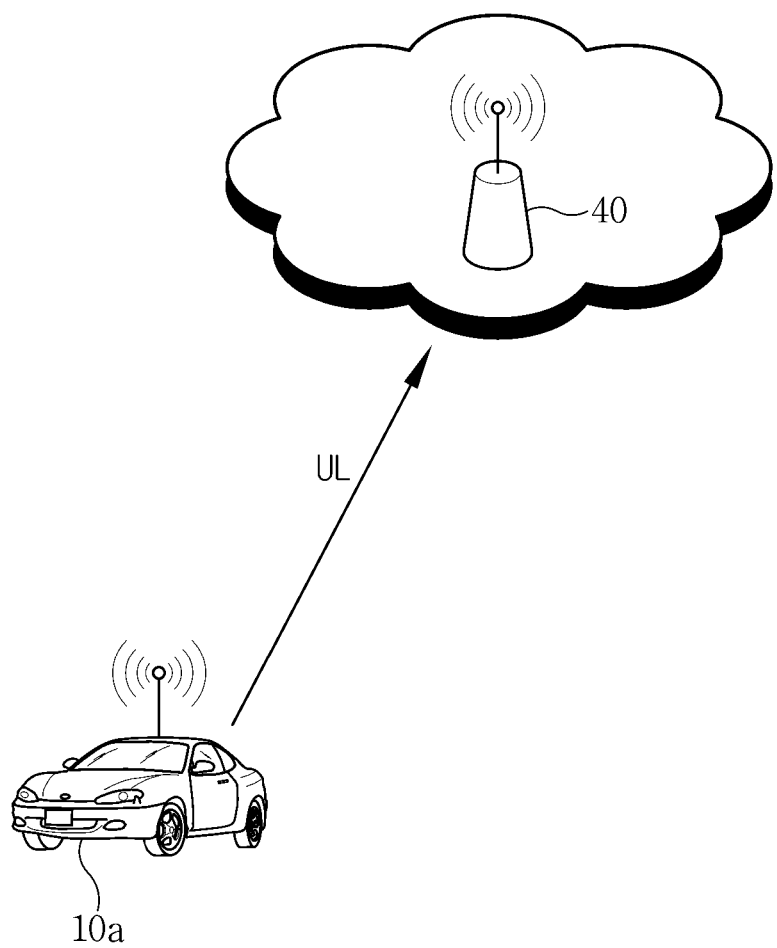
FIG. 3B is a diagram showing transmission of messages between a vehicle terminal and an RSU through an uplink.
Figure 3C:
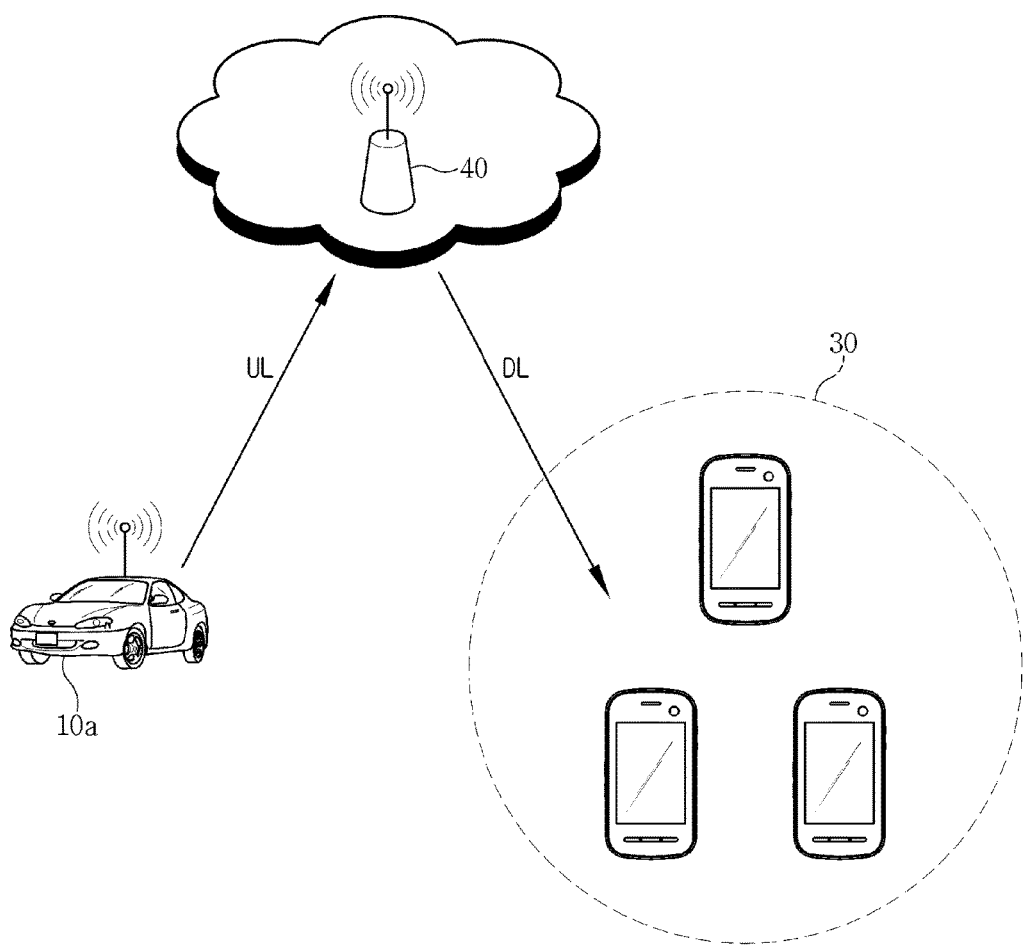
FIG. 3C is a diagram showing transmission of messages between a vehicle terminal and a pedestrian terminal through a base station.

FIGS. 2A to 2C are diagrams showing direct transmission of messages between terminals through a sidelink, and FIGS. 3A to 3C are diagrams showing transmission of messages between terminals through a base station.

Referring to FIGS. 2A to 3C, the vehicular communication system according to an embodiment of the present invention includes a first vehicle terminal 10a, a second vehicle terminal 10b, an RSU 20, a pedestrian terminal 30, and a base station 40.

The vehicular communication of FIGS. 2A to 2C refers to direct transmission of message between terminals through a sidelink and not through the base station 40, and may include vehicle to vehicle (V2V) communication between the first vehicle terminal 10a and the second vehicle terminal 10b, vehicle to infrastructure (V2I) communication between the first vehicle terminal 10a and the RUS 20, and vehicle to pedestrian (V2P) communication between the first vehicle terminal 10a and the pedestrian terminal 30.

The vehicular communication of FIGS. 3A to 3C shows vehicular communication through the base station 40. V2V, V2I, and V2P communication may be performed using an uplink for transmission to the base station 40 and a downlink for transmission from the base station 40.

Vehicular communication according to the present invention may be applicable to both of a communication structure based on a sidelink, as shown in FIGS. 2A to 2C, and a communication structure using an uplink or downlink, as shown in FIGS. 3A to 3C, and may be associated with message transmission processing at the side of a vehicle terminal in such a vehicular communication system.

Figure 4:
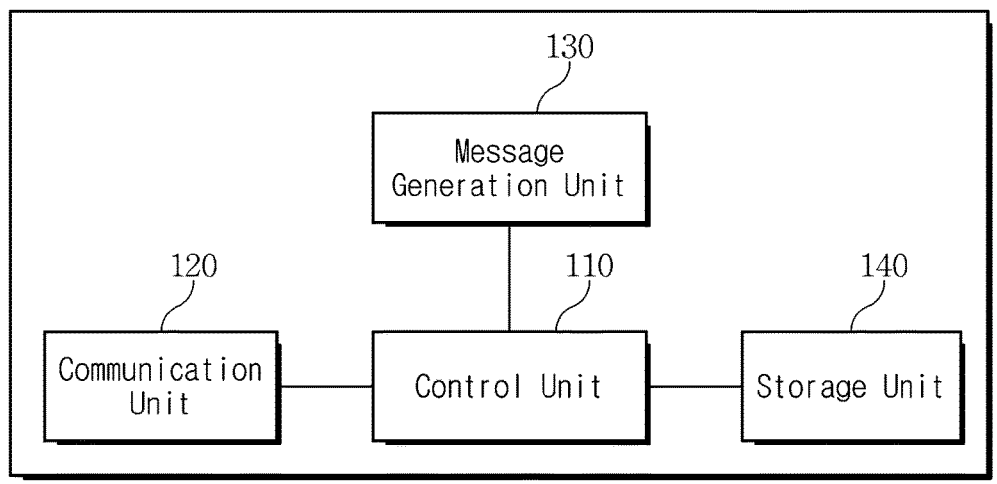
FIG. 4 is a diagram showing a configuration of an adaptive transmission apparatus in a vehicle terminal according to an embodiment of the present invention.

FIG. 4 is a diagram showing a configuration of an adaptive transmission apparatus in a vehicle terminal according to an embodiment of the present invention. Referring to FIG. 4, an adaptive transmission apparatus 100 according to the present invention includes a control unit 110, a communication unit 120, a message generation unit 130, and a storage unit 140.

The communication unit 120 provides a communication interface for V2X communication of the present invention. Through the communication unit 120, the vehicle terminal may request resource allocation through communication with a base station and may perform communication to transmit or receive messages to or from a partner terminal.

The partner terminal may be another vehicle terminal, a pedestrian terminal, or an RSU, as shown in FIGS. 2A to 2C and FIGS. 3A to 3C.

According to an embodiment of the present invention, the message generation unit 130 generates a message to be transmitted by the vehicle terminal to the partner terminal according to a traffic model.

In a simulation experiment according to an embodiment of the present invention, the vehicle terminal generated a message according to a periodic traffic model.

According to an embodiment of the present invention, for the periodic traffic, one 300-byte message is generated, and then four 190-byte messages are generated.

The storage unit 140, which is a device for storing data, stores an application program needed to execute functions of the adaptive transmission apparatus 100.

In particular, the storage unit 140 according to the present invention stores categories including the number of RBs, a transmission probability, the number of transmissions, etc, for performance evaluation based on transmission of messages from the vehicle terminal to the partner terminal, conditions including the number of subframes or the like, and information regarding a speed of the vehicle terminal.

The stored transmission probability may be set in consideration of the speed of the vehicle terminal.

The control unit 110 is responsible for overall control of adaptive transmission for improving vehicular communication performance according to the present invention.

In particular, the control unit 110 may control resource allocation by requesting that the base station allocate resources and may control a process of the vehicle terminal transmitting the message generated by the message generation unit 130 by using the allocated resources according to a predetermined transmission probability. In this case, information such as the speed of the vehicle terminal and the number of transmissions may be additionally considered along with the transmission probability.

In particular, the control unit 110 according to the present invention may set a transmission probability for the message transmission. The control unit 110 may consider the speed of the vehicle terminal when setting the transmission probability.

Figure 5:
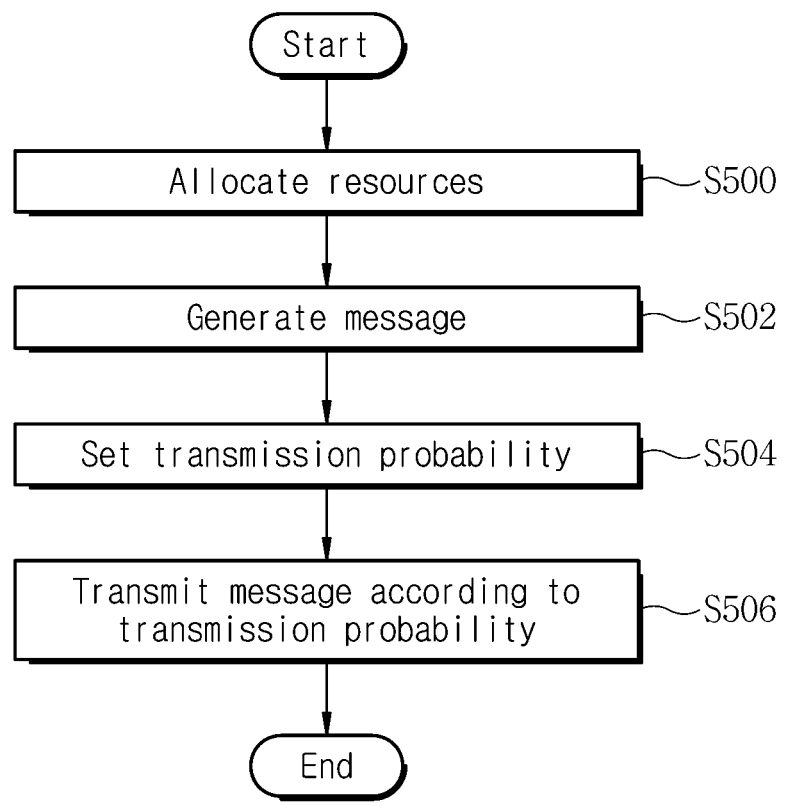
FIG. 5 is a diagram showing a message transmission order according to an embodiment of the present invention.

FIG. 5 is a diagram showing a message transmission order according to an embodiment of the present invention.

Referring to FIG. 5, first, resources used to transmit a message are allocated. In this case, the resources may be randomly allocated in a frequency domain and a time domain. The resources are allocated in units of a subchannel in the frequency domain and in units of a subframe in the time domain (S500).

Subsequently, a vehicle terminal generates a message according to a traffic model (S502).

The vehicle sets a message transmission probability (S504) and transmits the message to a partner terminal according to the set message transmission probability (S506).

When the transmission probability is set, a speed of the vehicle terminal may be considered.

In a simulation experiment according to an embodiment of the present invention, the transmission probability was set to be 1 or 0.5.

Performance analysis regarding adaptive transmission of a message generated according to a periodic traffic model by a vehicle terminal on a freeway will be described below with reference to FIGS. 6 to 13 and Tables 1 to 10.

First, packet reception ratios (PRRs) were considered for the performance analysis according to the present invention.

It was possible to obtain higher PRRs when the adaptive transmission technique according to an embodiment of the present invention was applied than when a conventional vehicular communication system was used. The application of the adaptive transmission technique according to an embodiment of the present invention caused a decrease in interference between vehicles, thereby improving the PRRs.

A result of the performance analysis may be represented by using cumulative distribution functions (CDFs) of the PRRs and average PRRs, as shown in FIGS. 6 to 13.

For a single transmission packet, PRRs are calculated with X/Y. Here, Y is the number of partner terminals located in a range (a, b) from a vehicular terminal $T_x$, and X is the number of partner terminals that perform successful reception. During the evaluation, CDFs of the PRRs and average PRRs were as follows.

a=0, b=150 m for an urban area, and b=320 m for a freeway when the CDFs of the PRRs were calculated.

The average PRRs were calculated with $(X_1+X_2+X_3 \ldots +X_n)/(Y_1+Y_2+Y_3 \ldots +Y_n)$. Here, n denotes the number of messages generated in the simulation experiment according to the present invention.

Information regarding time resources, frequency resources, a transmission probability, the number of transmissions, etc., which were used in the simulation experiment according to the present invention were determined according to categories 1 to 4 and conditions 1 and 2 of Tables 1 and 2 below:

TABLE 1

| Category | Total number of RBs ($N_F$) | Transmission Probability ($P_{tc}$) | Number of Transmissions (R) |
|---|---|---|---|
| 1 | 100 | 1 | 4 |
| 2 | 100 | 1 | 2 |
| 3 | 50 | 1/2 | 4 |
| 4 | 50 | 1/2 | 2 |

TABLE 2

| | Condition | 1 | 2 |
|---|---|---|---|
| 300 Bytes | Number of RBs | 10 | 10 |
| | Number of Subframes | 3 | 2 |
| | Code rate | 0.3030 | 0.5284 |
| | (Modulation/$I_{TBS}$) | (QPSK/5) | (QPSK/8) |
| 190 Bytes | Number of RBs | 10 | 10 |
| | Number of Subframes | 2 | 1 |
| | Code rate | 0.2879 | 0.5758 |
| | (Modulation/$I_{TBS}$) | (QPSK/5) | (QPSK/9) |

For the vehicle speed, the category, and the condition, the average number of RBs colliding per subframe (Colliding RBs), the number of RBs unused and vacant (Unused RBs), and the number of RBs used (Used RBs) are shown in Tables 3 to 6 below.

Table 3 represents a resource state under condition 1 while the speed of the vehicle terminal is 70 km/h, Table 4 represents a resource state under condition 1 while the speed of the vehicle terminal is 140 km/h, Table 5 represents a resource state under condition 2 while the speed of the vehicle terminal is 70 km/h, and Table 6 represents a resource state under condition 2 while the speed of the vehicle terminal is 140 km/h.

TABLE 3

| Category | Colliding RBs | Unused RBs | Used RBs |
|---|---|---|---|
| 1 | 67.4 | 12.1 | 87.9 |
| 2 | 37.9 | 30.4 | 69.6 |
| 3 | 31.6 | 8.3 | 41.7 |
| 4 | 19.6 | 13.3 | 36.7 |

TABLE 4

| Category | Colliding RBs | Unused RBs | Used RBs |
|---|---|---|---|
| 1 | 36.3 | 32.6 | 67.4 |
| 2 | 17.4 | 51.5 | 48.5 |
| 3 | 20.8 | 14.1 | 35.9 |
| 4 | 9.3 | 24.1 | 25.9 |

TABLE 5

| Category | Colliding RBs | Unused RBs | Used RBs |
|---|---|---|---|
| 1 | 51 | 22.3 | 77.7 |
| 2 | 22.7 | 41.4 | 58.6 |
| 3 | 23.8 | 13.1 | 36.9 |
| 4 | 11.7 | 19.4 | 30.6 |

TABLE 6

| Category | Colliding RBs | Unused RBs | Used RBs |
|---|---|---|---|
| 1 | 18.5 | 49.6 | 50.4 |
| 2 | 5.3 | 68.9 | 31.1 |
| 3 | 8.7 | 24.4 | 25.6 |
| 4 | 4.5 | 31.3 | 18.7 |

Performance analysis for each category was performed as follows. In the case of category 1, the number of RBs allocated was 100, and the number of transmissions was 4. The number of RBs used was the largest, and thus the number of RBs that collided was largest. In the case of category 2, the number of RBs allocated was 100, and the number of transmissions was 2. The number of transmissions was smaller in category 2 than in category 1. Accordingly, the number of RBs used decreased, and thus the number of RBs that collided decreased in comparison to category 1. In the case of category 3 and category 4, it can be seen that the number of RBs allocated decreased to 50, and thus a collision probability increased, but because the transmission probability was ½, the number of RBs that collided decreased. Also, the number of transmissions was 4 in category 3, and the number of transmissions was 2 in category 4. It can be seen that the number of RBs used decreased, and thus the number of RBs that collided deceased as the number of transmissions decreased.

Performance analysis for each condition was performed as follows.

In the case of condition 2, the number of subframes allocated was 2 (300 bytes) and 1 (190 bytes). It can be seen that the number of subframes allocated decreased in comparison to condition 1, and thus the number of RBs used and the number of RBs that collided decreased on the whole.

PRR performance was analyzed by comparing the CDFs of the PRRs and the average PRRs.

Figure 6:
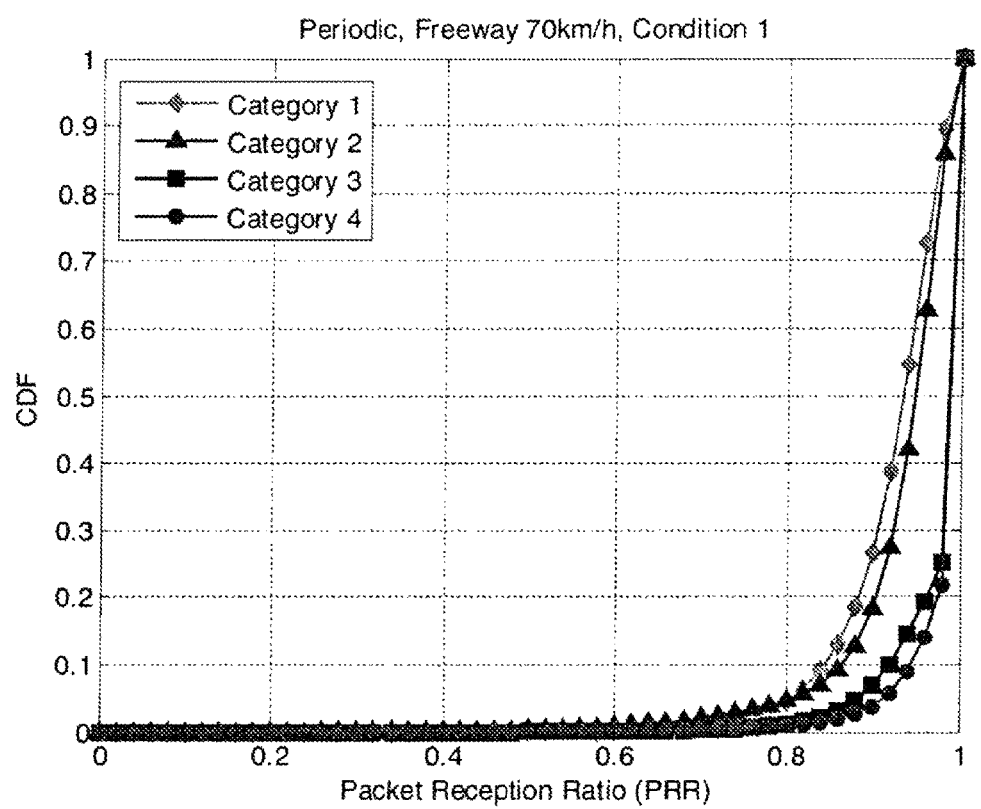
FIG. 6 is a diagram showing cumulative distribution functions (CDFs) of packet reception ratios (PRRs) when a speed of a vehicle terminal is 70 km/h under condition 1.
Figure 7:
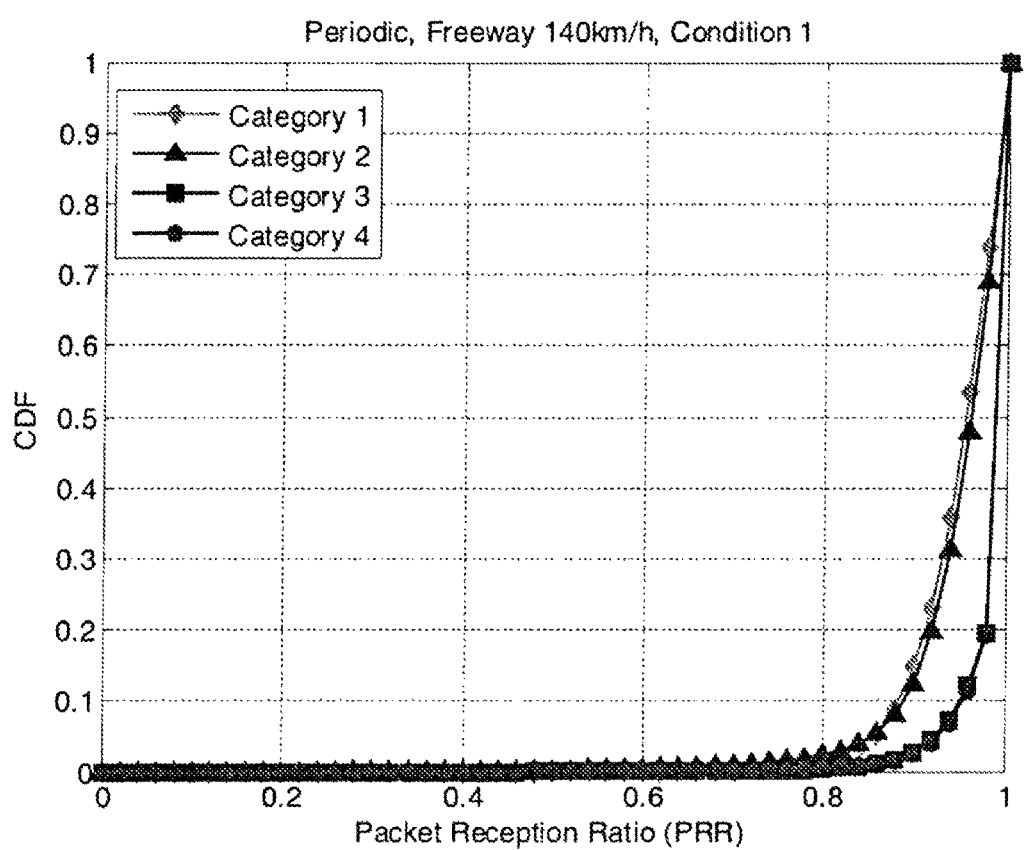
FIG. 7 is a diagram showing CDFs of PRRs when a speed of a vehicle terminal is 140 km/h under condition 1.
Figure 8:
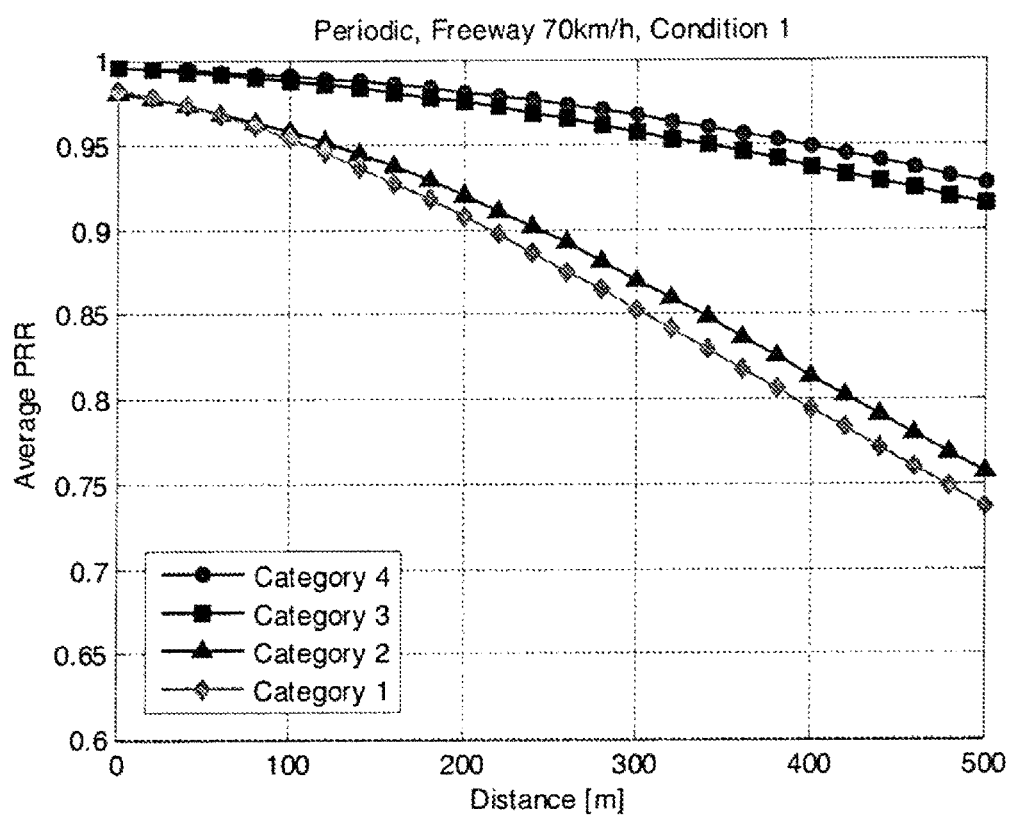
FIG. 8 is a diagram showing average PRRs when a speed of a vehicle terminal is 70 km/h under condition 1.

FIGS. 6 and 7 show CDFs of PRRs while the speed of the vehicle terminal is 70 km/h and 140 km/h under condition 1, respectively. FIG. 8 and Table 7 show average PRRs while the speed of the vehicle terminal is 70 km/h under condition 1.

Figure 9:
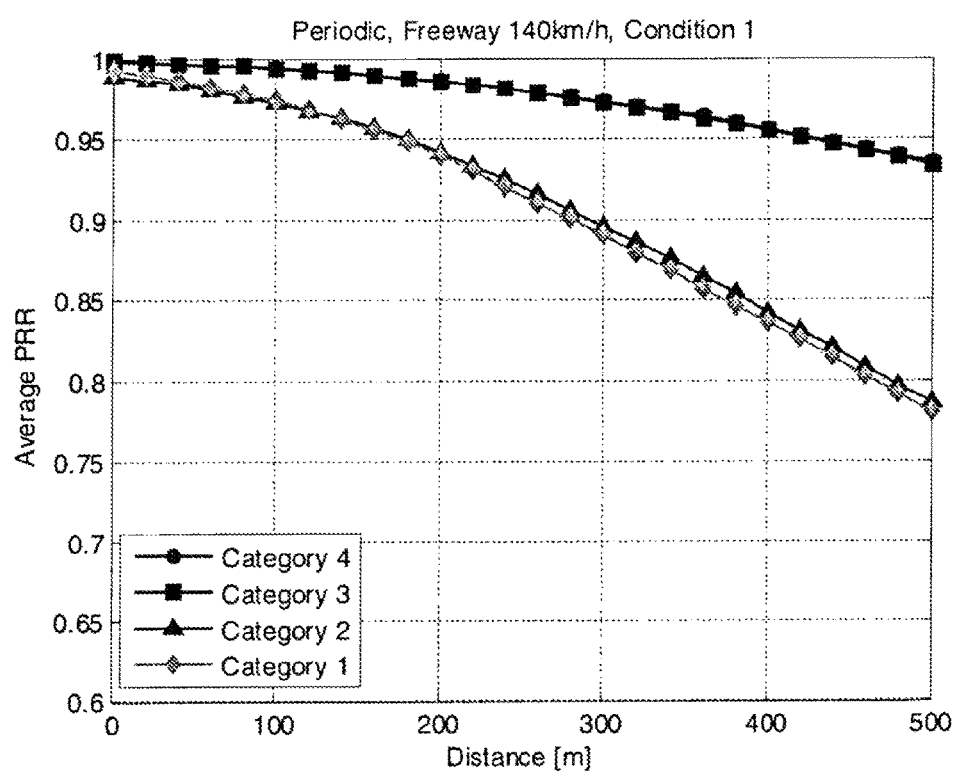
FIG. 9 is a diagram showing average PRRs when a speed of a vehicle terminal is 140 km/h under condition 1.

FIG. 9 and Table 8 show average PRRs while the speed of the vehicle terminal is 140 km/h under condition 1.

TABLE 7

| Range (m) | Category 1 | Category 2 | Category 3 | Category 4 |
|---|---|---|---|---|
| 20~40 | 0.9778 | 0.9770 | 0.9941 | 0.9948 |
| 60~80 | 0.9673 | 0.9682 | 0.9912 | 0.9928 |
| 100~120 | 0.9538 | 0.9576 | 0.9877 | 0.9902 |
| 140~160 | 0.9365 | 0.9443 | 0.9830 | 0.9870 |
| 180~200 | 0.9177 | 0.9291 | 0.9774 | 0.9829 |
| 220~240 | 0.8973 | 0.9111 | 0.9715 | 0.9781 |
| 260~280 | 0.8754 | 0.8920 | 0.9648 | 0.9729 |
| 300~320 | 0.8530 | 0.8700 | 0.9570 | 0.9666 |
| 340~360 | 0.8294 | 0.8482 | 0.9491 | 0.9596 |
| 380~400 | 0.8054 | 0.8245 | 0.9409 | 0.9520 |
| 420~440 | 0.7830 | 0.8013 | 0.9325 | 0.9441 |
| 460~480 | 0.7593 | 0.7787 | 0.9238 | 0.9359 |
| 500~520 | 0.7366 | 0.7566 | 0.9148 | 0.9273 |

TABLE 8

| Range (m) | Category 1 | Category 2 | Category 3 | Category 4 |
|---|---|---|---|---|
| 20~40 | 0.9895 | 0.9863 | 0.9975 | 0.9970 |
| 60~80 | 0.9822 | 0.9805 | 0.9958 | 0.9957 |
| 100~120 | 0.9736 | 0.9721 | 0.9938 | 0.9939 |
| 140~160 | 0.9617 | 0.9623 | 0.9911 | 0.9909 |
| 180~200 | 0.9472 | 0.9493 | 0.9876 | 0.9876 |
| 220~240 | 0.9298 | 0.9335 | 0.9833 | 0.9832 |
| 260~280 | 0.9102 | 0.9157 | 0.9776 | 0.9786 |
| 300~320 | 0.8904 | 0.8959 | 0.9722 | 0.9731 |
| 340~360 | 0.8686 | 0.8756 | 0.9658 | 0.9664 |
| 380~400 | 0.8464 | 0.8542 | 0.9585 | 0.9593 |
| 420~440 | 0.8257 | 0.8316 | 0.9506 | 0.9513 |
| 460~480 | 0.8029 | 0.8086 | 0.9419 | 0.9434 |
| 500~520 | 0.7797 | 0.7865 | 0.9336 | 0.9347 |

In the case of category 3 and category 4 to which the technique proposed according to the present invention was applied, it can be seen that the PRR performance was improved because resource collisions decreased, and thus influence of interference decreased. Also, since the number of transmissions decreased from 4 (category 1 or 3) to 2 (category 2 or 4), there was a tradeoff between the influence of interference and a signal to interference plus noise ratio (SINR) gain. When a distance between vehicles was short, the SINR is greater than the influence of interference, and thus the performance was improved when the number of transmissions was 4. On the other hand, when a distance between vehicles was long, the influence of interference was greater than the SINR, and thus the performance was improved when the number of transmissions was 2.

Figure 10:
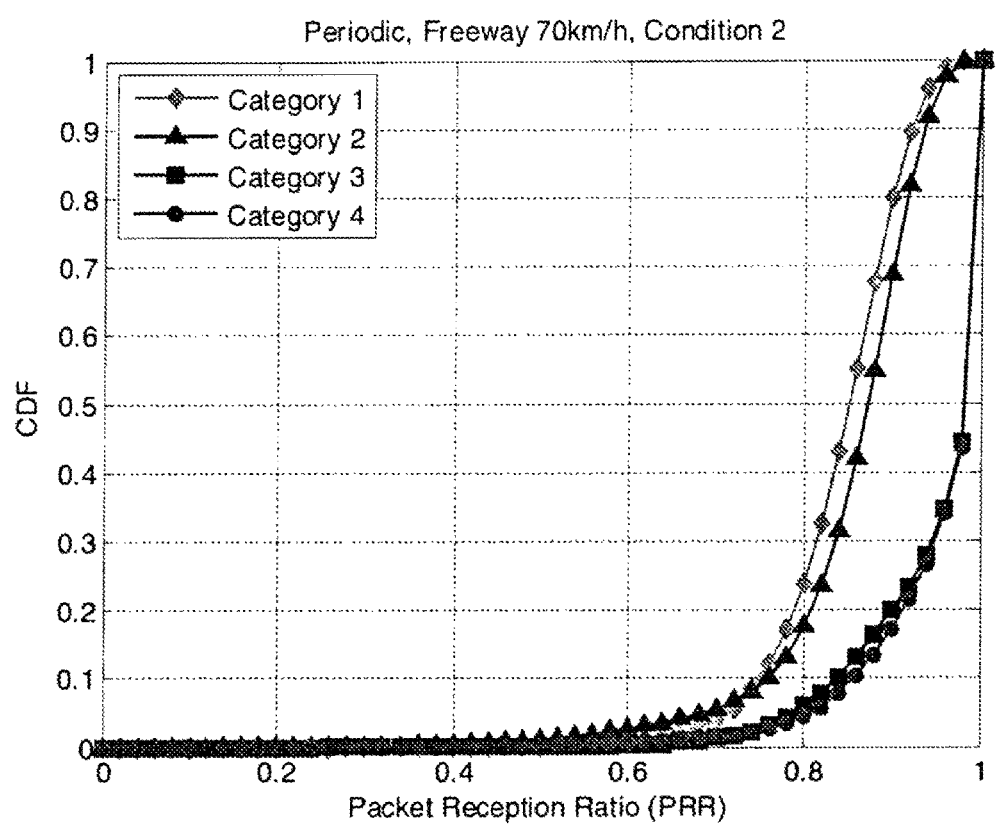
FIG. 10 is a diagram showing CDFs of PRRs when a speed of a vehicle terminal is 70 km/h under condition 2.
Figure 11:
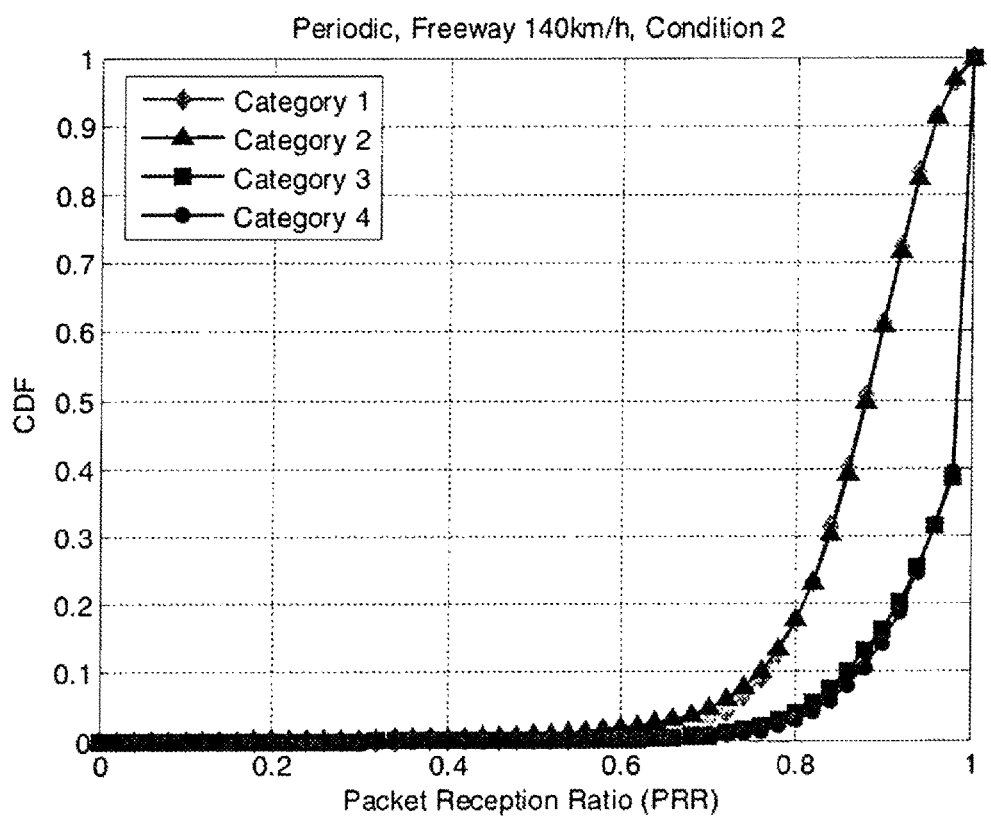
FIG. 11 is a diagram showing CDFs of PRRs when a speed of a vehicle terminal is 140 km/h under condition 2.
Figure 12:
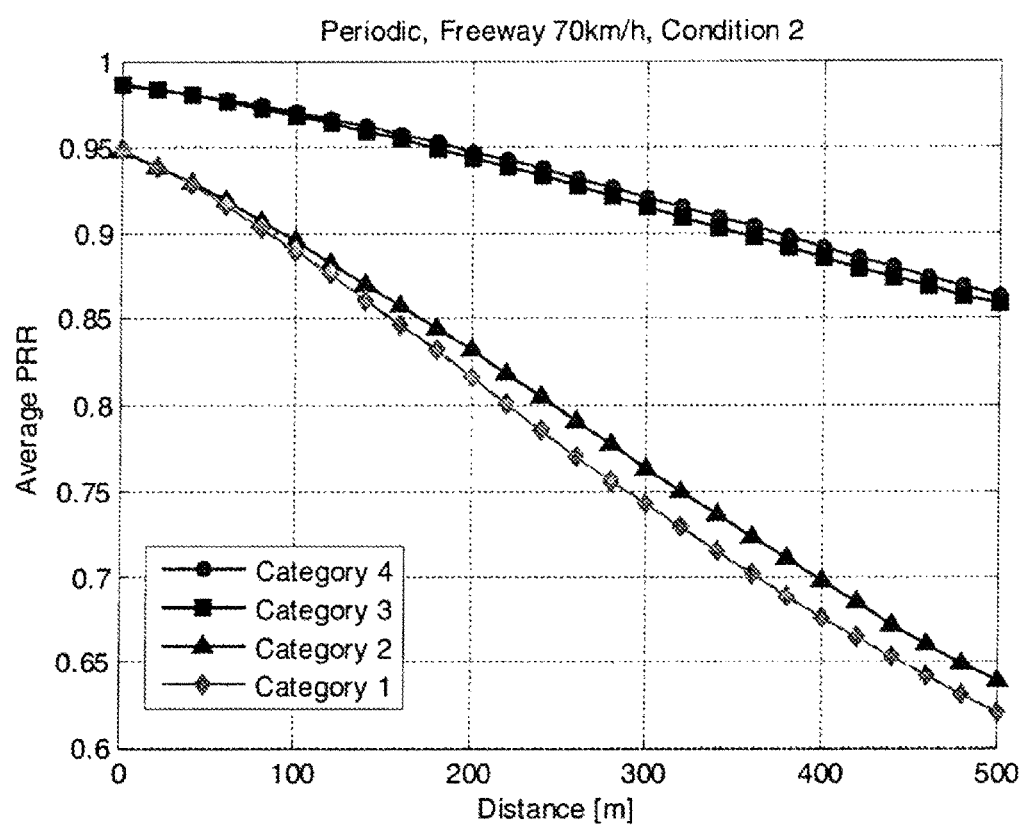
FIG. 12 is a diagram showing average PRRs when a speed of a vehicle terminal is 70 km/h under condition 2.
Figure 13:
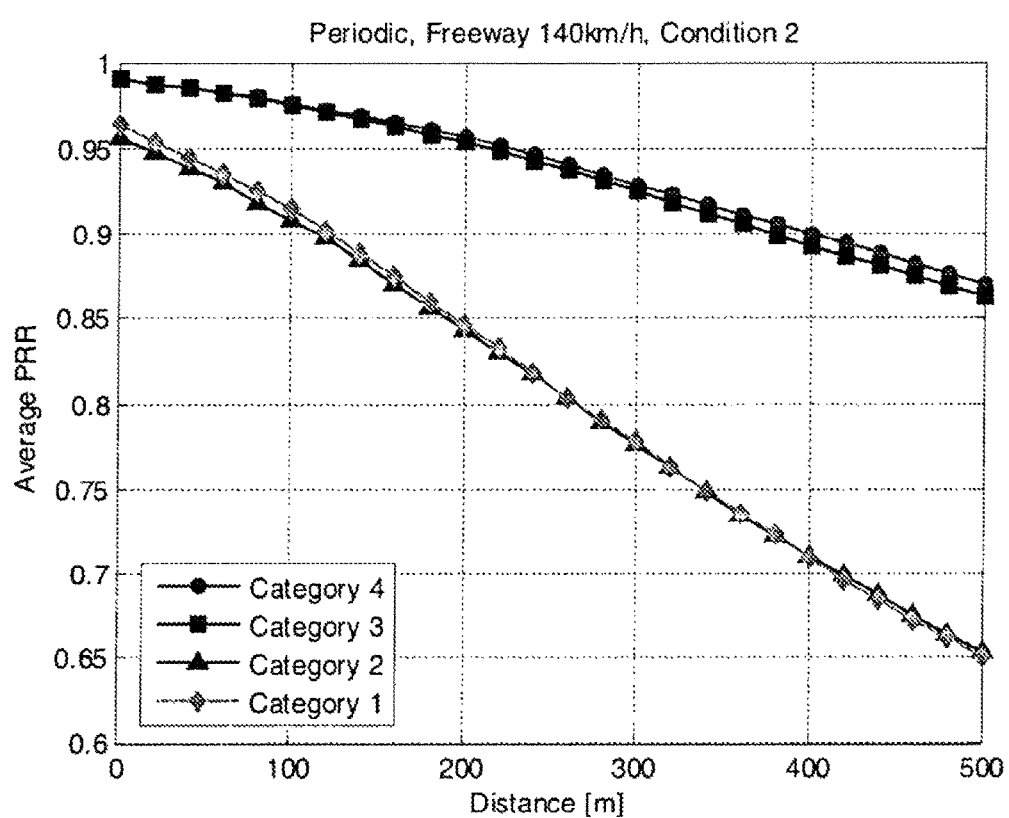
FIG. 13 is a diagram showing average PRRs when a speed of a vehicle terminal is 140 km/h under condition 2.

FIGS. 10 and 11 show CDFs of PRRs while the speed of the vehicle terminal is 70 km/h and 140 km/h under condition 2, respectively. FIG. 12 and Table 9 show average PRRs while the speed of the vehicle terminal is 70 km/h under condition 2. FIG. 13 and Table 10 show average PRRs while the speed of the vehicle terminal is 140 km/h under condition 2.

TABLE 9

| Range (m) | Category 1 | Category 2 | Category 3 | Category 4 |
|---|---|---|---|---|
| 20~40 | 0.9380 | 0.9385 | 0.9829 | 0.9830 |
| 60~80 | 0.9159 | 0.9184 | 0.9759 | 0.9771 |
| 100~120 | 0.8892 | 0.8949 | 0.9679 | 0.9697 |
| 140~160 | 0.8611 | 0.8696 | 0.9589 | 0.9615 |
| 180~200 | 0.8317 | 0.8442 | 0.9484 | 0.9521 |
| 220~240 | 0.8003 | 0.8174 | 0.9383 | 0.9420 |
| 260~280 | 0.7704 | 0.7902 | 0.9273 | 0.9316 |
| 300~320 | 0.7423 | 0.7631 | 0.9149 | 0.9201 |
| 340~360 | 0.7151 | 0.7367 | 0.9030 | 0.9091 |
| 380~400 | 0.6884 | 0.7106 | 0.8916 | 0.8972 |
| 420~440 | 0.6647 | 0.6853 | 0.8795 | 0.8856 |
| 460~480 | 0.6425 | 0.6603 | 0.8686 | 0.8742 |
| 500~520 | 0.6212 | 0.6389 | 0.8582 | 0.8633 |

TABLE 10

| Range (m) | Category 1 | Category 2 | Category 3 | Category 4 |
|---|---|---|---|---|
| 20~40 | 0.9535 | 0.9474 | 0.9877 | 0.9876 |
| 60~80 | 0.9351 | 0.9300 | 0.9821 | 0.9824 |
| 100~120 | 0.9148 | 0.9078 | 0.9748 | 0.9762 |
| 140~160 | 0.8882 | 0.8845 | 0.9665 | 0.9688 |
| 180~200 | 0.8595 | 0.8568 | 0.9579 | 0.9605 |
| 220~240 | 0.8336 | 0.8305 | 0.9482 | 0.9517 |
| 260~280 | 0.8040 | 0.8034 | 0.9373 | 0.9406 |
| 300~320 | 0.7780 | 0.7760 | 0.9247 | 0.9285 |
| 340~360 | 0.7480 | 0.7488 | 0.9117 | 0.9165 |
| 380~400 | 0.7225 | 0.7220 | 0.8989 | 0.9055 |
| 420~440 | 0.6956 | 0.6986 | 0.8860 | 0.8940 |
| 460~480 | 0.6716 | 0.6746 | 0.8753 | 0.8821 |
| 500~520 | 0.6504 | 0.6537 | 0.8629 | 0.8703 |

It can be seen that the influence of interference decreased because the number of subframes allocated under condition 2 was smaller than that under condition 1, but the performance was further improved under condition 1 than under condition 2 because a coding gain under condition 1 was greater than that under condition 2.

It can also be seen that the performance was further degraded when the speed of the vehicle terminal was 70 km/h than when the speed of the vehicle terminal was 140 km/h. The performance degradation is due to an increase in interference caused by resource collision along with an increase in density of vehicles.

When the present invention is applied to a vehicular communication system, it is possible to improve vehicular communication performance by obtaining higher PRRs than when a conventional vehicular communication system is used, and thus interference between vehicles is decreased.

Also, according to the present invention, it is possible to secure a technology for a vehicular communication system with high reliability and a short delay.

While this specification contains many specifics, the specifics are not to be construed as limitations on the scope of the claims or of what may be claimed, but rather as descriptions of features specific to particular embodiments.

Features described in the specification in the context of individual embodiments may be implemented as a combination in a single embodiment. In contrast, features described in the specification in the context of a single embodiment may be individually implemented in multiple embodiments or in an appropriate sub-combination.

Furthermore, the features may operate in a certain combination and may be initially described as claimed in the combination, but one or more features may be excluded from the claimed combination in some cases, and the claimed combination may be changed into a sub-combination or a modification of a sub-combination.

Similarly, even though operations are described in a certain order in the drawings, the operations are not to be understood as having to be executed in the certain order or in a sequential order to obtain desired results, and not all of the operations have to be executed.

Thus, particular embodiments have been described. Other embodiments are within the scope of the following claims.

For example, the operations cited in the claims may be performed in a different order and still achieve desirable results. As an example, operations depicted in the drawings in a particular order are not to be understood as required to be performed in the particular order shown or in sequential order.

The description suggests the best mode of the invention to provide an example that explains the invention and also enables one skilled in the art to manufacture and use the present invention. It should be understood that the embodiments disclosed herein are merely illustrative and are not intended to limit the scope of the invention. Although specific embodiments have been illustrated and described herein, it should be obvious to those skilled in the art that modifications of the present invention may be made without departing from the technical scope of the present invention as disclosed in the appended claims.

The present invention relates to an adaptive transmission method for a vehicular communication system, that is, a method of randomly allocating resources in a time domain and a frequency domain to perform vehicular communication in a Long-Term Evolution (LTE)-based vehicle to everything (V2X) system and determining whether to transmit messages according to a transmission probability such that it is possible to improve cumulative distribution functions (CDFs) of packet reception ratios (PRRs) and average PRRs by decreasing interference between vehicles.

Moreover, the present invention is industrially applicable since the possibility of sales or business thereof is sufficient and a practical implementation thereof is obvious.

What is claimed is:

1. An adaptive transmission method for improving vehicular communication performance in a vehicle to everything (V2X) system based on a mobile communication network, which is performed by a vehicle terminal, the adaptive transmission method comprising:

receiving allocated resources;
setting a message transmission probability; and
transmitting a message to a partner terminal by using the allocated resources according to the set transmission probability,
wherein the receiving comprises receiving resources randomly allocated in units of a subchannel in a frequency domain and receiving resources randomly allocated in units of a subframe in a time domain in consideration of the total number of resource blocks, the number of resource bocks allocated upon data transmission, the number of subframes depending on a message size, and a data generation period,
wherein the setting is performed in consideration of a speed of the vehicle terminal, and
wherein the transmitting is performed in consideration of the speed of the vehicle terminal and the number of transmissions.

2. The adaptive transmission method of claim 1, wherein the vehicular communication performance is determined in consideration of packet reception ratios (PRRs).

3. The adaptive transmission method of claim 1, wherein the partner terminal is any one of another vehicle terminal, a pedestrian terminal, and a road side unit (RSU).

4. The adaptive transmission method of claim 1, wherein the message is generated according to a traffic model, and the traffic model is a periodic traffic model or an event-trigger traffic model.

5. The adaptive transmission method of claim 1, wherein the vehicular communication performance is affected by a combination of one or more of the resources used to transmit the message, the transmission probability, the speed of the vehicle terminal, or the number of transmissions.

6. An adaptive transmission apparatus for improving vehicular communication performance based on a mobile communication network having a base station or a partner terminal comprising:

a communication unit configured to transmit or receive data to or from the base station or the partner terminal;
a storage unit configured to store a program; and
a control unit connected with the communication unit and the storage unit, and configured to, by executing the program stored in the storage unit,
generate a message according to a traffic model,
request that the base station allocate resources through the communication unit, and
control transmission of the generated message by using the allocated resources according to a preset transmission probability,
wherein the resources are randomly allocated in units of a subchannel in a frequency domain and randomly allocated in units of a subframe in a time domain in consideration of the total number of resource blocks, the number of resource bocks allocated upon data transmission, the number of subframes depending on a message size, and a data generation period, and
wherein the transmission probability is set in consideration of a speed of a vehicle terminal, and set in consideration of the speed of the vehicle terminal and the number of transmissions upon message transmission.

* * * * *